United States Patent [19]

Siebein et al.

[11] Patent Number: 5,118,646

[45] Date of Patent: Jun. 2, 1992

[54] PROCESS FOR IMPROVING THE STRENGTH OF SIALON

[75] Inventors: Kerry N. Siebein, Hopkinton; Russell Yeckley, Oakham; Claude Brown, Jr., Dudley, all of Mass.

[73] Assignee: Norton Company, Worcester, Mass.

[21] Appl. No.: 616,462

[22] Filed: Nov. 21, 1990

[51] Int. Cl.⁵ .............................................. C04B 35/58
[52] U.S. Cl. ........................................ 501/98; 501/96; 264/66; 427/226; 427/227
[58] Field of Search ................ 501/96, 98; 264/66; 427/226, 227

[56] References Cited

U.S. PATENT DOCUMENTS

| | | | |
|---|---|---|---|
| 4,127,416 | 10/1984 | Lumby et al. | 501/98 |
| 4,506,021 | 3/1985 | Jack et al. | 501/98 |
| 4,558,018 | 12/1985 | Matsuhiro et al. | 501/98 X |
| 5,017,530 | 5/1991 | Arakawa et al. | 501/98 |

Primary Examiner—Karl Group
Attorney, Agent, or Firm—Volker R. Ulbrich

[57] ABSTRACT

A process for improving the strength of components manufactured from sialon comprising heating and components at a temperature of from about 750° to 950° C. for from about eight to thirty-six hours in an oxygen-containing atmosphere.

7 Claims, No Drawings

PROCESS FOR IMPROVING THE STRENGTH OF SIALON

BACKGROUND OF THE INVENTION

Ceramic materials are becoming widely used in industry today. Ceramics because of their lower costs are being substituted for steel and other metal-based materials in the construction of a variety of devices and machining parts. For example, ceramics are being used as replacements for steel and other metal materials in the manufacture of car bodies, airplane parts, turbine blades, flow control valves, engine parts, metal cutting, forging dies, extrusion dies.

Sialon, an acronym for silicon aluminum oxynitride, is a particularly useful ceramic material which is generally prepared from a mixture of silicon nitride, alumina, aluminum nitride, and a sintering aid such as yttria. The problem with many ceramics, including sialon, is that treatments to increase their strength often deleteriously effect their fracture resistance and ceramics need to have superior characteristics in both areas, not just one, to be equivalent to the steel or other metal materials that they are seeking to replace. Moreover, valves and other engine components usually require grinding to specific shapes and tolerances and the grinding introduces surface damage that reduces the strength of the component. The strength reduction is greater when stressed in a direction perpendicular to the grinding direction which frequently occurs in complex parts such as valves. The machining damage often results in component failures in subsequent use.

Oxidation treatments have been used to partially heal machining stress crack damage with ceramics other than sialon, the problem with doing so for sialon is that the sialon is extremely susceptible to secondary recrystallization which can degrade the fracture toughness of the final body.

Accordingly, it is an object of the present invention to improve the strength properties of sialon without diminishing its fracture toughness.

SUMMARY OF THE INVENTION

The present invention is directed to a process for improving the strength properties of sialon without negatively affecting its fracture toughness. As defined herein sialon is silicon aluminum oxynitride and is prepared from a combination of silicon nitride, alumina, aluminum nitride, and a sintering aid such as yttria. The process comprises treating a component of sialon in an oxygen-containing atmosphere at a temperature between about 750° to 950.C. for about eight to thirty-six hours.

DETAILED DESCRIPTION OF THE INVENTION

The sialon sintered bodies strengthened by the present process are single phase ceramic materials of the general formula

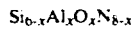

$Si_{6-x}Al_xO_xN_{8-x}$ wherein x is between about 0.38 and 1.5, and between about 0.1 and 10% by weight of a second component in the form of an oxide of at least one of the elements yttrium, scandium, cerium, lanthanum, and the metals of the lanthanide series. The mixture is sintered in a protective environment at a temperature between about 1,600° and 2,000° C. and for a time, decreasing with increasing temperature, of at least about 10 minutes to at least about 5 hours so as to produce the sialon containing at least 80% by volume of said single phase ceramic material together with a second phase containing said at least one further element. The sialon bodies are conventional materials prepared by conventional processes well-described in the prior art, c.f. U.S. Pat. No. 4,127,416, the subject matter of which is incorporated herein by reference.

Preferably, the sialon contains about 83-87 weight % silicon nitride, about 2-5 weight % alumina, about 2-7 weight % aluminum nitride, and about 4-10 weight % of the oxide component. More preferably the sialon contains about 84-86 weight % silicon nitride, about 2-4 weight % alumina, about 3-5 weight % aluminum nitride, and about 6-8 weight % of the oxide component.

Oxidation treatments of the sialon components are carried out at a temperature of from about 750° C. to 950° C. for about 8 to 36 hours, preferably about 800° C. to 900° C. for about ten to thirty-six hours, so as to increase the strength of the transverse ground flexure bars of the component. Most preferably, the heat treatment is carried out at temperatures of from about 825° to 875° C. and for about 10 to 18 hours. The heat treatment may be carried out in any conventional means such as in any conventional air fired furnace, although it is presently preferred to perform the oxidative heat treatment of the sialon component in a furnace with alumina insulation and molydenum disilicide elements with the parts baffled by alumina to protect from element flaking. Heat treatments at these specified temperatures in an oxygen atmosphere produces the greatest strength increase of the sialon material without adversely affecting its fracture toughness. Treatments of the sialon component at temperatures about 1000° C. and higher have been found to cause the glassy phase of the sialon to crystallize and thus cause the fracture toughness of the components to decrease. Lower temperature treatments, i.e. at temperatures of 700° C. and lower, were found ineffective to sufficiently increase the strength of the sialon to above 95 ksi. Shorter times than about 8 hours are not effective even at higher temperatures because crystallization of the glassy phase begins to occur at 1000° C. As the time of the heat treatment is extended beyond about 18 hours, the strength and the fracture toughness both start to degrade and after about 36 hours pits begin to form due to crystallization of the oxide layer.

The invention will now be described with reference to the following non-limiting examples in which all parts and percents are by weight unless otherwise specified:

EXAMPLE 1

The sialon composition used in this example was prepared from a mixture of about 86% silicon nitride, 3% alumina, 4% aluminum nitride, and 7% yttria. The mixture was dry pressed into 3 inch square by ¼ inch thick tiles and cold isostatic pressed at 30,000 psi. The green parts were air fired at 600° C. for ten hours and sintered at a maximum temperature of 1800° C. for 60 minutes in 1 atmosphere nitrogen. The sintered tiles were then machined into flexure bars 4 mm × 3 mm × 50 mm.

Individual components were then heated in air at a ramp rate of 20° C. per minute in a Lindberg furnace with molydenum disilicide elements at the temperatures and for the times listed in Table 1. Thereafter, strength, surface breaks and average toughness measurements were taken for each component. The results of multiple samples under the different conditions are reported in Table 1. For 0 minutes treatment, cooling was started as soon as the treatment temperature was reached.

The "Machine Dir." refers to the direction of final grinding in which L is longitudinal and T is transverse. T is the more severe direction because the medial cracks produced during machining are oriented perpendicular to the applied stress and thus crack extension occurs at lower applied loads.

The "Strength" is the result of MIL Standard 1942 (MR) and the average value of 10 samples is reported for each treatment condition. The higher the strength reported above the baseline for the particular machining direction, the better the result.

"Surface Breaks" refers to the number of samples in which the failure originated at the surface of the bar as a result of machining damage observed during fractography analysis. It is determined by optical microscopy and SEM. The smaller the percentage of surface breaks for the transverse ground specimens the better the result.

The "Avg. Toughness" in $MPa/m^{\frac{1}{2}}$ as determined using a method established by Anstis et al., "A Critical Evaluation of Indentation Techniques for Measuring Fracture Toughness: I Direct Crack Measurements." J Am. Cer. Soc., Vol. 64, No. 9, Sep. 1981, pp 533–538, is reported for 5 measurements at each test condition. The higher the fracture toughness reported the better the result.

"Std. Dev." is the standard deviation for the strength and fracture toughness results, respectively.

TABLE I

| Oxidative Treatment | Machine Dir | Strength (ksi) (avg) | Std Dev | Surface Breaks | Avg Toughness | Std Dev |
|---|---|---|---|---|---|---|
| Baseline | L | 104.2 | 17.0 | 5 of 10 | $MPa/m^{\frac{1}{2}}$ | |
| Baseline | T | 84.4 | 2.3 | 4 of 4 | 4.34 | |
| 800° C./ 1 hr | L | 99.4 | 18.4 | 5 of 10 | 4.313 | 0.099 |
| 800° C./ 6 hr | T | 95.3 | 4.3 | 9 of 10 | 4.448 | 0.334 |
| 800° C./ 18 hr | L | 112.7 | 8.6 | 7 of 10 | 4.223 | 0.074 |
| 800° C./ 36 hr | T | 102.9 | 5.5 | 9 of 10 | 4.125 | 0.060 |
| 900° C./ 1 hr | T | 98.8 | 3.6 | 15 of 20 | 4.248 | 0.114 |
| 900° C./ 6 hr | L | 101.4 | 16.4 | 6 of 10 | 4.497 | 0.139 |
| 900° C./ 18 hr | T | 105.0 | 8.4 | 17 of 20 | 4.332 | 0.117 |
| 900° C./ 36 hr | L | 101.3 | 13.7 | 7 of 10 | 4.251 | 0.049 |
| 1000° C./ 1 hr | T | 111.7 | 5.3 | 7 of 10 | 4.353 | 0.175 |
| 1000° C./ 6 hr | L | 96.9 | 15.1 | 3 of 10 | 3.895 | 0.073 |
| 1000° C./ 18 hr | T | 92.8 | 21.6 | 1 of 4 | 2.285 | 0.125 |
| 1000° C./ 36 hr | L | 74.4 | 20.0 | 3 of 10 | 2.861 | 0.014 |
| 1100° C./ 1 hr | L | 83.3 | 18.8 | 2 of 10 | 2.390 | 0.076 |
| 1100° C./ 6 hr | T | 81.9 | 16.9 | 3 of 10 | 2.642 | 0.091 |
| 1100° C./ 18 hr | L | 83.1 | 13.0 | 2 of 10 | 2.674 | 0.117 |
| 1100° C./ 36 hr | T | 83.1 | 11.2 | 4 of 10 | 2.862 | 0.116 |

As can be seen from Table I, the oxide layer produced by the treatments at 800° C. and 900° C. for 1 and 6 hours was not sufficient to heal the machining cracks. The strengths of the samples oxidized at 800° C. and 900° C. for 1 and 6 hours are less than the longitudinal baseline strength of the sialon material. The samples oxidized at 800° C. and 900° C. for 18 hours have strengths similar to or greater than the baseline longitudinal strength. The samples oxidized at 800° C. and 900° C. for 36 hours have strengths slightly less than the baseline longitudinal strength and there is slight evidence of crystallization. The strength of the samples oxidized at 1000° C. for 1 hour is the highest strength obtained, but crystallization of the glassy phase is evident. Deviations in the heat treatment time or temperature cause a dramatic decrease in strength.

COMPARATIVE EXAMPLE A

The same sialon composition as described in Example 1 was used to prepare additional bodies which were evaluated to determine the effect of heat treatments at temperatures below 800° C. The results are shown in Table II:

TABLE II

Strength after oxidation at 600 and 700° C. of transverses ground flexure bars

| Temp (°C.) | Time (hr) | Avg. Strength (ksi) |
|---|---|---|
| Baseline | | 72.9 |
| 600 | 36 | 80.8 |
| 700 | 6 | 79.5 |
| 700 | 18 | 93.9 |
| 700 | 36 | 87.6 |

As the data demonstrates, even the best result (at 70 for 18 hours) is still insufficient to heal the machining damage and thus is substantially inferior to higher temperature treatments. Moreover, the lower temperature was not suitable because the strength after oxidation was less than the longitudinal baseline.

The data in Tables I and II demonstrate that heat treatments at temperatures of from about 750° to 950° C. for about eight to thirty-six hours results in a sialon component with improved strength properties without sacrificing toughness and that heating outside of this narrow range causes degradation of the properties of the sialon.

COMPARATIVE EXAMPLE B

High temperature short time treatments in argon were used to increase the strength of sialon. In these experiments the sialon was processed as in Example 1 but with an additional step. After the bars were machined, a crack was introduced by indenting the surface with a Vickers indent at 5 kg load. This allowed the number of flexure test samples to be reduced to 3 at each condition for evaluation of the suitability of these conditions for healing surface damage. The strength of the bars increase after all treatments as seen in Table III. Optical and SEM examination of the bar surface, however, showed that surface pitting and reaction products were forming that would wear off in engine applications, making this an unsuitable approach for healing machining damage.

TABLE III

High Temperature Short Time Treatments

| Treatment Temp °C | Treatment time (minutes) | Strength (avg.) |
|---|---|---|
| Baseline | | 49,375 |
| 1500 | 15 | 74,385 |
| 1500 | 30 | 84,093 |
| 1500 | 15 | 94,946 |
| 1550 | 30 | 86,276 |
| 1600 | 0 | 101,328 |
| 1650 | 30 | 107,203 |
| 1700 | 0 | 106,762 |
| 1700 | 15 | 81,518 |

COMPARATIVE EXAMPLE C

Following the same procedure as Comparative Example B sialon bars were subjected to steam environments at the temperature and times shown in Table IV. The steam environment did not affect the strength of the flexure bar.

TABLE IV

Results for Steam Treatments

| Treatment Temp °C | Treatment time (minutes) | Strength (avg.) |
|---|---|---|
| Baseline | | 48,466 |
| 200 | 1 | 48,881 |
| 200 | 10 | 51,162 |
| 200 | 40 | 50,610 |
| 300 | 1 | 50,721 |
| 300 | 10 | 49,199 |
| 300 | 40 | 54,587 |
| 400 | 1 | 49,744 |
| 400 | 10 | 49,980 |
| 400 | 40 | 52,734 |

What is claimed is:

1. A process for improving the strength of a sintered component comprising sialon comprising heating the component in an oxygen-containing atmosphere at a temperature of from about 750° C. to 950° C. for from about 8 to 36 hours, wherein the fracture toughness is increased or is decreased by less than about 5% and the transverse strength is at least about 95% of the longitudinal ground strength.

2. The process of claim 1 wherein the component is heated at a temperature of from about 800° to 900° C. for about 10 to 36 hours.

3. The process of claim 1 wherein the component is heated at a temperature of about 825° to 875° C. for about 10 to 18 hours.

4. The process of claim 1 wherein the component is heated in air.

5. The process of claim 1 wherein the sialon is prepared from a composition comprising about 83 to about 87 weight % silicon nitride, about 2 to about 5 weight % alumina, about 2 to about 7 weight % aluminum nitride, and about 4 to about 10 weight % sintering aid oxide or compound which will decompose to said oxide.

6. The process of claim 1 wherein the sialon is prepared from a composition comprising about 84 to about 86 weight % silicon nitride, about 2 to about 4 weight % alumina, about 3 to about 5 weight % aluminum nitride, and about 6 to about 8 weight sintering aid oxide or compound which will decompose to said oxide.

7. The process of claim 5 wherein the sintering aid oxide is selected from the group consisting of yttria, lanthana, other rare earth oxides, compounds which will decompose to yield said oxides, and mixtures thereof.

* * * * *